(12) United States Patent
Meier et al.

(10) Patent No.: US 10,325,504 B2
(45) Date of Patent: Jun. 18, 2019

(54) SYSTEM AND METHOD FOR OPTIMIZATION OF AIRCRAFT FUEL ECONOMY IN REAL-TIME

(71) Applicant: The Boeing Company, Chicago, IL (US)

(72) Inventors: Oliver C. Meier, Mill Creek, WA (US); Roy A. Eggink, Mukilteo, WA (US); Kristoffer R. Jonson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 143 days.

(21) Appl. No.: 15/463,126

(22) Filed: Mar. 20, 2017

(65) Prior Publication Data

US 2018/0268722 A1  Sep. 20, 2018

(51) Int. Cl.
*B64D 43/02* (2006.01)
*G08G 5/00* (2006.01)
(Continued)

(52) U.S. Cl.
CPC .......... *G08G 5/0047* (2013.01); *B64D 43/00* (2013.01); *B64D 43/02* (2013.01);
(Continued)

(58) Field of Classification Search
CPC ...... G05D 1/0005; G01K 15/00; G01K 7/021; G08G 5/0034; G08G 5/0078;
(Continued)

(56) References Cited

U.S. PATENT DOCUMENTS 4,159,088 A  6/1979  Cosley
6,002,972 A * 12/1999  Palmer .................. B64D 15/20
                                                            180/116
(Continued)

FOREIGN PATENT DOCUMENTS

EP    2685292 A2   1/2014
FR    3022625 A1  12/2015

OTHER PUBLICATIONS

Gilyard, In-Flight Transport Performance Optimization: an Experimental Flight Research Program and an Operational Scenario, 1997, IEEE, p. 7.2-33 to 7.2-49 (Year: 1997).*
(Continued)

*Primary Examiner* — McDieunel Marc
(74) *Attorney, Agent, or Firm* — Toler Law Group, P.C.

(57) ABSTRACT

A system and method for the real-time optimization of aircraft fuel economy includes sensors to monitor in-flight performance characteristics, to monitor the status of aircraft control elements during flight, to monitor fuel consumption, and to identify aircraft position information during flight. A processor is coupled to receive information from the sensors. During flight, the processor calculates a current performance level by entering the received information into a predetermined flight model. The processor then determines, based on a comparison of the calculated current performance level with a predetermined expected performance level, a current level of fuel efficiency. Next, the processor determines any parameter changes for improving fuel efficiency. Finally, the processor causes the determined parameter changes to be displayed on a flight deck display. The flight crew may then selectively implement one or more of the determined parameter changes via the flight deck display.

20 Claims, 2 Drawing Sheets

(51) Int. Cl.
  *G07C 5/08* (2006.01)
  *B64D 45/00* (2006.01)
  *B64D 43/00* (2006.01)
  *G01C 21/20* (2006.01)
  *G01C 23/00* (2006.01)
  *G05D 1/00* (2006.01)

(52) U.S. Cl.
  CPC ......... *B64D 45/0005* (2013.01); *G01C 21/20* (2013.01); *G01C 23/00* (2013.01); *G05D 1/0005* (2013.01); *G07C 5/0816* (2013.01)

(58) Field of Classification Search
  CPC .. G08G 5/0047; B64D 43/02; B64D 45/0005; G07C 5/0816; G01C 21/20; B64C 13/20; B64C 15/20
  See application file for complete search history.

(56) References Cited

U.S. PATENT DOCUMENTS

| | | | | |
|---|---|---|---|---|
| 6,253,126 | B1* | 6/2001 | Palmer | B64C 13/50 244/158.1 |
| 6,654,685 | B2 | 11/2003 | McIntyre | |
| 7,577,501 | B2* | 8/2009 | Tafs | G07C 5/085 434/30 |
| 8,509,968 | B1 | 8/2013 | Saccone et al. | |
| 8,781,649 | B2* | 7/2014 | Kar | G08G 5/0021 701/3 |
| 10,035,609 | B2* | 7/2018 | Ziarno | B64D 45/00 |
| 2005/0192717 | A1* | 9/2005 | Tafs | G07C 5/085 701/3 |
| 2006/0155432 | A1* | 7/2006 | Brown | G01C 21/20 701/14 |
| 2009/0306839 | A1* | 12/2009 | Youngquist | G01K 7/021 701/14 |
| 2013/0080043 | A1* | 3/2013 | Ballin | G08G 5/0034 701/120 |
| 2015/0323933 | A1 | 11/2015 | Darbois et al. | |

OTHER PUBLICATIONS

Ples et al., Advanced Aircraft Performance Modeling for ATM: Analysis of Bada Model Capabilities, 2010, IEEE (Year: 2010).*
Larsen et al., Further Development of In-Flight Diagnostic Systems for Aircraft Mechanical Systems, 2010, IEEE, p. 87-91 (Year: 2010).*
Jiazue et al., A Method of Aircraft Fuel Consumption Performance Evaluation Based on RELAX Signal Separation, 2015, IEEE, p. 1433-1437 (Year: 2015).*
Extended European Search Report for Application No. 18161985.9 dated Jul. 4, 2018, 7 pgs.

* cited by examiner

SYSTEM AND METHOD FOR OPTIMIZATION OF AIRCRAFT FUEL ECONOMY IN REAL-TIME

FIELD

This disclosure relates generally to a system and method for optimizing aircraft fuel economy and, more particularly, for monitoring and optimizing aircraft fuel economy in real-time during flight.

BACKGROUND

The crew members of a commercial aircraft rely on instrumentation and associated sensors to monitor fuel consumption and remaining fuel stores during a flight segment. However, the information provided by such instrumentation and sensors alone does not provide any indication of real-time fuel efficiency. Instead, fuel efficiency information for a particular flight is typically calculated after the flight based on data obtained from the aircraft's instrumentation systems. Although the crew of a commercial aircraft can implement certain procedures to improve fuel efficiency during a flight segment, it is believed that there is currently no way to provide the crew with information in real-time regarding any current deficiency in expected fuel economy that would indicate that such procedures need to be implemented.

Accordingly, there is a need for a system and method which monitors and provides for the optimization of fuel economy of an aircraft in real-time.

SUMMARY

In a first aspect, a system for the real-time optimization of aircraft fuel economy is disclosed. One or more first sensors monitor in-flight performance characteristics. A processor is coupled to receive information from the one or more first sensors. The processor is configured to calculate a current performance level by entering the received information into a predetermined flight model, determine, based on a comparison of the calculated current performance level with a predetermined expected performance level, a current level of fuel efficiency, determine any parameter changes for improving fuel efficiency, and cause the determined parameter changes to be displayed on a flight deck display.

In one further embodiment, one or more second sensors may be provided for monitoring the status of aircraft control elements during flight. In this embodiment, processor may be coupled to receive information from the one or more second sensors and the information entered into the predetermined flight model may include the information from the one or more first sensors and the one or more second sensors.

In another further embodiment, a third sensor may be provided for monitoring fuel consumption. In this embodiment, the processor may be coupled to receive information from the third sensor and the information entered into the predetermined flight model may include the information from the one or more first sensors and the third sensor.

In yet another further embodiment, a fourth sensor may be provided for identifying aircraft position information during flight. In this embodiment, the processor may be coupled to receive information from the fourth sensor and the information entered into the predetermined flight model may include the information from the one or more first sensors and the fourth sensor.

Still further, the flight deck displays may be configured to receive input and to automatically provide signals implementing one or more of the displayed parameter changes based on received input. Also, one or more of the determined parameter changes may be automatically implemented. Further, the one or more first sensors may be a Pitot probe, a static pressure probe and/or a total air temperature probe. Finally, the one or more second sensors may monitor the status of aircraft spoilers, flaps, gears, flaperons, rudder vertical tail and/or ailerons.

In a second aspect, a system for the real-time optimization of aircraft fuel economy is disclosed. One or more first sensors monitor the status of aircraft control elements during flight. A processor is coupled to receive information from the one or more first sensors. The processor is configured to calculate a current performance level by entering the received information into a predetermined flight model, determine, based on a comparison of the calculated current performance level with a predetermined expected performance level, a current level of fuel efficiency, determine any parameter changes for improving fuel efficiency, and cause the determined parameter changes to be displayed on the flight deck display.

In one further embodiment, one or more second sensors may be provided for monitoring in-flight performance characteristics. In this embodiment, the processor may be coupled to receive information from the one or more second sensors and the information entered into the predetermined flight model may include the information from the one or more first sensors and the one or more second sensors.

In another further embodiment, a third sensor may be provided for monitoring fuel consumption. In this embodiment, the processor may be coupled to receive information from the third sensor and the information entered into the predetermined flight model may include the information from the one or more first sensors and the third sensor.

In yet another embodiment, a fourth sensor may be provided for identifying aircraft position information during flight. In this embodiment, the processor may be coupled to receive information from the fourth sensor and the information entered into the predetermined flight model may include the information from the one or more first sensors and the fourth sensor.

Still further, the flight deck displays may be configured to receive input and, based on the received input, signals are automatically provided implementing one or more of the displayed parameter changes. Also, one or more of the determined parameter changes may be automatically implemented. Further, the one or more first sensors may monitor the status of aircraft spoilers, flaps, gears, flaperons, rudder vertical tail and/or ailerons. Finally, the one or more second sensors may be a Pitot probe, a static pressure probe and/or a total air temperature probe.

In a third aspect, a method for the real-time optimization of aircraft fuel economy is disclosed. Information is received from one or more first sensors monitoring in-flight performance characteristics. A current performance level is calculated by entering the received information into a predetermined flight model. Based on a comparison of the calculated current performance level with a predetermined expected performance level, a current level of fuel efficiency is determined. Any parameter changes for improving fuel efficiency are determined. Finally, the determined parameter changes are caused to be displayed on a flight deck display.

In one further embodiment, information may also be received from one or more second sensors for monitoring the status of aircraft control elements during flight. In this embodiment, the information received from the one or more second sensors may be part of the information used to calculate the current performance level.

In another further embodiment, information may be received from a third sensor for monitoring fuel consumption. In this embodiment, the information received from the third sensor may be part of the information used to calculate the current performance level.

In yet another embodiment, one or more of the determined parameter changes may be automatically implemented.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Disclosed herein is an on-board integrated performance system and method which monitors key performance parameters during flight of an aircraft and provides optimized tail-specific performance information allowing for precise performance-based inflight optimization. A number of key performance parameters are monitored, including, for example, nautical air miles (NAMs), fuel flow, drag, weight, center of gravity (cg), air speed (Mach), cost index, flight time, airframe and engine status. Based on in-flight optimization, a number of performance characteristics may be adjusted to optimize performance, including but not limited to speed, altitude, cost index, heading change and flight profile adjustments. The system and method of the present disclosure provides a physics-based weight estimator to get an independent calculation of in-flight weight and center of gravity that can be used to more precisely optimize efficiency. The system and method of the present disclosure also provides an end of flight report that analyzes and documents a number of flight details, including an actual versus pre-flight score card, a list of adjustments to consider and a list of potential maintenance issues. The flight reports may be aggregated off-board to perform data analytics to determine further improvements to be applied in later flights, including, for example, maintenance actions, flight planning optimization, and aircraft equipment upgrade. During flight, the system and method of the present disclosure adds real-time processing capability that determines fuel economy in real-time based on system feedback processed in the avionics system. This information allows the flight crew to compare actual performance against expected performance in real-time to determine if the aircraft is performing as expected or to decide if a given crew action has improved or degraded efficiency.

Figure 1:
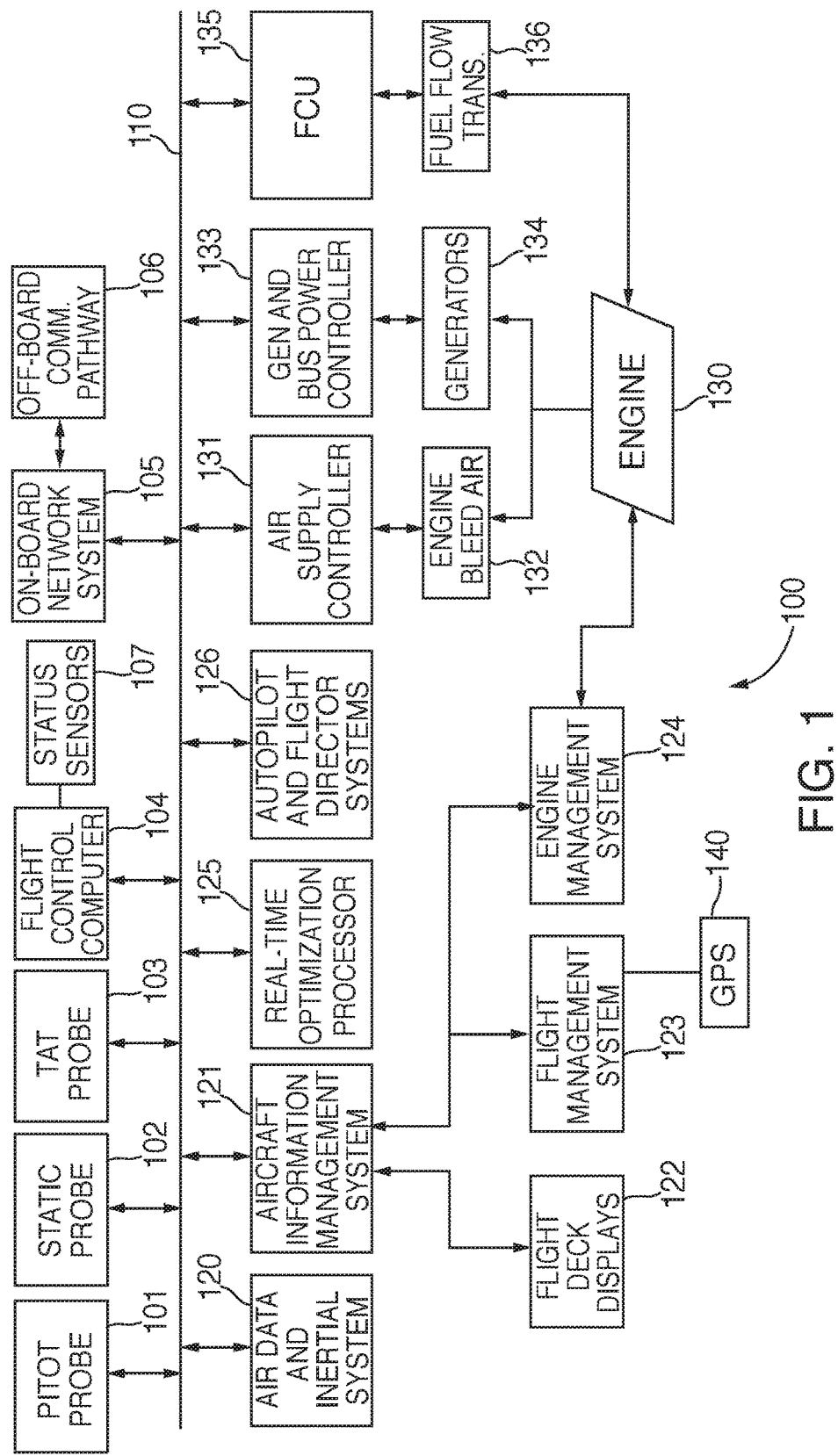
FIG. 1 is a block diagram of a real-time aircraft performance optimization system according to the present disclosure.

Referring now to FIG. 1, an aircraft 100 includes data bus 110 that electrically couples all of the main control systems and sensors used to manage the flight thereof. Data bus 110 may be an actual data bus or an internal computer network. In particular, a Pitot probe 101, a static pressure probe 102 and a total air temperature (TAT) probe 103 are each coupled to the data bus 110. The data from Pitot probe 101, static pressure probe 102 and TAT probe 103 are used to determine the various speed and altitude measurements (e.g., altimeter reading, airspeed indicator, true-airspeed indicator, Mach-meter and vertical-speed indicator) as known in the art. The air data and inertial systems 120 is coupled to gyros and accelerometers (not shown) that provide six-axis acceleration data which is used to determine altitude, pressure altitude, heading, track, velocity vectors, angle rates, track angle, wind speed, temperature and angle of attack. The aircraft information management system 121 receives air data information from the air data and inertial system 120 and other on-board avionics systems to integrate all the generated information for recording, display on flight deck displays 122 and computing as necessary. For the purposes of this application, flight deck displays 122 may include any fixed display screen units installed in the cockpit and/or a display screen on a crew member's electronic flight bag (EFB).

The flight management system 123 uses aerodynamic models, and maintenance staff and pilot entries to schedule the flight path, monitor the current flight via positional sensors such as a global positioning system (GPS) sensor 140 and provide course information to the autopilot and flight director systems 126. The aerodynamic models and adjustments are produced through an independent process. The maintenance staff entries specify adjustments required to model current performance of the aircraft. The pilot entries, e.g., gross weight and center of gravity, are required to set the initial conditions of the aircraft prior to flight.

The flight control computer 104 processes and converts autopilot commands to surface commands that are then provided to one or more of the aircraft control elements, e.g., spoilers, flaps, gears, flaperons, rudder vertical tail and ailerons, to control the current flight as known in the art. Status sensors 107 are used to monitor the state of such control elements. The autopilot and flight director systems 126 control heading, track, speed, and altitude based on information from the flight management system 123.

The engine management system 124 is coupled to control engine 130 (although only one engine is shown in FIG. 1, as one of ordinary skill in the art will readily recognize, a modern commercial aircraft normally includes a number of engines) and provides commands to control thrust through thrust levers or a thrust management system. Engine bleed air 132 from engine 130 is typically provided under the control of air supply controller 131 to intermediate or high-stage engine compressors to power on-board systems including, for example, air conditioning, anti-icing, cargo heating and other environmental systems. Power extraction is performed by generators 134 installed on each engine 130. These generators 134 are the primary source of AC power during flight and the power extraction process is controlled by generator and bus power controller 133. Fuel is supplied to the engines 130 for combustion by the fuel system based on thrust lever position. A fuel flow transmitter 136 monitors the fuel supply lines and provides a signal to the aircraft gas turbine Fuel Control Unit (FCU) 135 for display via the aircraft information management system 121 and for use in the in-flight weight determination performed by real-time optimization processor 125 (as discussed below).

On-board network system 105 is a data processor which processes and stores all information, e.g., performance reports and recommendations, produced by the real-time optimization processor 125, as discussed below. An off-board communication pathway 106 is provided which is coupled to the on-board network system 105 and provides a connectivity path for transmitting all the information produced by the real-time optimization processor 125 to a main depository for post-flight analysis. The connectivity path may be satellite-based (e.g., SATCOM), wireless networking (WIFI), an aircraft communications addressing and reporting system (ACARs), etc. The main depository is a central database which may be "cloud-based" and is used to aggregate and store information from the real-time optimization processors 125 in each aircraft in the entire fleet for later use. Users may access the aggregated data to perform analytics to identify trends in the data in combination with other data sources, e.g., aircraft maintenance history, to further improve performance of both each individual aircraft and of the entire fleet.

Real-time optimization processor 125 is coupled to data bus 110 and gathers data from all the available on-board data sources (e.g., airspeed, thrust setting, altitude, fuel flow, etc.) and then processes the data to determine the current level of fuel-efficiency (e.g., fuel mileage) and the deviation of the current level of fuel-efficiency from the expected level of fuel-efficiency. The processing may be performed using a predetermined flight model of the expected performance of the particular aircraft, for example, and comparing a flight model based on the received data with a predetermined expected performance level (based on the current real-time flight status) to determine the current level of fuel efficiency. The predetermined flight model may be updated from time to time based on fuel-efficiency information produced on each flight. The fuel-efficiency information is output for viewing by the flight crew via one or more of the various flight deck displays. A separate processor may be provided to perform the necessary processing required to provide the functionality of real-time optimization processor 125, or the functionality thereof may be incorporated into an existing processing system in the aircraft. The data input to real-time optimization processor 125 also includes aircraft configuration data (e.g., status of flaps, status of landing gear, etc.) that is compared against a benchmark for the current scenario (e.g., current conditions and aircraft configuration) to identify any deviation therefrom. By optimizing aircraft operations, a significant cost savings may be provided due to a lower fuel burn and/or an increased payload. The real-time efficiency information also provides flight crews with real-time instructions on fuel optimization procedures (e.g., changing altitude or altering aircraft configuration). This system and method also influences flight crew behavior by providing real-time feedback on the impact that various actions may have on fuel efficiency. For example, the flight crew will receive a notification of reduced efficiency if the flaps are deployed earlier than expected by the flight model on approach. A similar notification would be provided if the flight crew activated the auxiliary power unit (APU) earlier than expected by the flight model. Real-time optimization processor 125 also determines operating parameter changes that modify the current operating conditions of the aircraft (e.g., current wind and other weather conditions, air traffic conditions, etc.) to, for example, selectively change course, altitude, or one or more other aircraft operating or configuration settings. The fuel-efficiency information from real-time optimization processor 125 and the suggested operating parameter changes are provided to the flight deck displays 122 for display to the flight crew. In addition, flight deck displays 122 may include touch-screen technology allowing the flight crew to immediately selectively implement one or more of the suggested operating parameter changes. Alternatively, the parameter changes may be selectively implemented using other methods, e.g., panel switches or voice commands. In an alternative embodiment, one or more of the parameter changes may be automatically implemented by, for example, forwarding the parameter change information to the autopilot and flight control computers 126. The operating parameter changes may be presented in an order of priority, based on expected performance improvements of each suggested parameter change.

Figure 2:
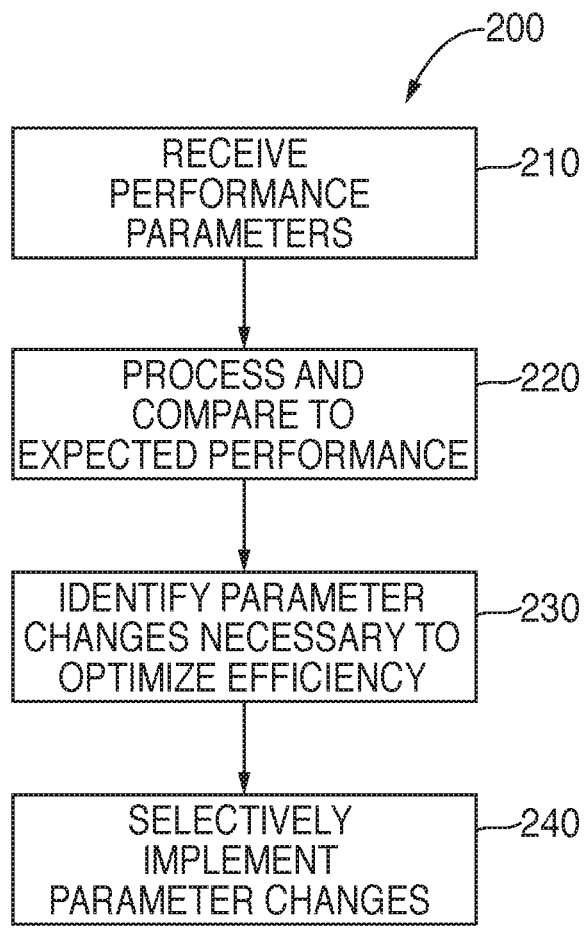
FIG. 2 is a flowchart of the operation of the real-time aircraft performance optimization system of the present disclosure.

Referring now to FIG. 2, a flow chart 200 is shown of the method of the present disclosure. At step 210, the various current operating performance parameters are received, e.g., at real-time optimization processor 125. This operating performance parameters may include, in one example, in-flight performance characteristics such as position, pressure altitude, Mach number, normal acceleration, temperature, engine state, fuel flow rate, engine bleed, power extraction, control surface and external configuration, gross weight and flight phase, and in-flight configuration information such as the status of control elements and the status of the landing gear. Next, at step 220, the current operating performance parameters are processed and compared to the expected performance, as discussed above. Further, at step 230, any parameter changes that may improve efficiency are identified. For example, based on an analysis of the flight model, it may be determined whether there is a more optimal flight speed or a more optimal flight altitude. Similarly, based on the current engine bleed demand, power extraction, forecasted winds, actual route taken and remaining flight distance, it may be determined whether there a more economical airspeed. Finally, based on an analysis of the current aircraft configuration and the current state of the flight, it may be determined if any aircraft configuration changes are required (e.g., flap retraction). Finally, at step 240, any identified parameter changes (e.g., flight operating parameters or aircraft configuration parameters) are identified and displayed via the flight deck displays 122. In this way, the flight crew is provided with the ability to selectively implement one or more of the parameter changes (e.g., via a touchscreen that is part of the flight deck display system) and signals are provided as necessary to implement such changes. In an alternative embodiment, one or more of the parameter changes may be automatically implemented by, for example, forwarding the parameter change information to the autopilot and flight control computers 126.

The system and method of the present disclosure implements a predetermined flight model which takes into account the ideal in-flight configuration (e.g., altitude, air-speed, angle of attack, heading) for each flight segment or phase, the current external conditions (e.g., altitude, wind speed and direction, temperature), the current internal conditions (e.g., a certain minimum level of engine bleed air may be required for heating the passenger compartment even though such usage reduces engine efficiency), the nautical miles per pound of fuel expended since flight departure (calculated by the aircraft information management system 121) and other factors to calculate the real-time efficiency information. When the real-time efficiency information differs adversely from a nominal level by a pre-determined (absolute or relative) threshold, then alternative flight plans and configurations are then identified that will yield improved performance for the remainder of the flight. The system and method of the present disclosure thus determines flight control changes for improved aircraft performance in real-time and presents these changes as options to the flight crew, allowing the flight crew to selectively implement one or more of these options based upon their knowledge of current conditions.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for the real-time optimization of aircraft fuel economy, comprising:
   one or more first sensors configured to generate first sensor data indicative of in-flight performance parameters; and
   a processor configured to receive the first sensor data from the one or more first sensors, the processor configured to:
      determine a current level of fuel efficiency for a flight segment of a flight path based on the first sensor data,
      determine a target level of fuel efficiency for the flight segment based on the first sensor data and an aircraft performance flight model, wherein the aircraft performance flight model is representative of fuel efficiency of the aircraft based on flight parameters of at least one prior flight,
      in response to determining that a difference between the current level of fuel efficiency and the target level of fuel efficiency satisfies a threshold, identifying at least one flight control parameter to be changed to increase fuel efficiency, and
      send a signal indicative of the at least one flight control parameter.

2. The system of claim 1, further comprising one or more second sensors configured to generate second sensor data indicative of flight control parameters, wherein the processor is configured to receive the second sensor data from the one or more second sensors, wherein the target level of fuel efficiency for the flight segment is further determined based on the second sensor data from the one or more second sensors, and wherein the flight control parameters comprise at least one of air-speed, an altitude, a cost index, an angle of attack, a heading, a flight path, a flight profile, a surface configuration of the aircraft, engine bleed, power extraction, or air supply.

3. The system of claim 1, further comprising a third sensor configured to generate third sensor data indicative of fuel consumption, wherein the processor is configured to receive the third sensor data from the third sensor and wherein the current level or the target level of fuel efficiency, or both, is further determined based on the third sensor data from the third sensor.

4. The system of claim 1, further comprising a fourth sensor configured to generate fourth sensor data indicative of aircraft position information during flight, and wherein the processor is configured to receive the fourth sensor data from the fourth sensor, and wherein the current level or the target level of fuel efficiency, or both, is further determined based on the fourth sensor data from the fourth sensor.

5. The system of claim 1, further comprising one or more flight deck displays, wherein the one or more flight deck displays are configured to receive the signal from the processor and to display a notification indicating the at least one flight control parameter to be changed.

6. The system of claim 1, wherein the signal is configured to cause the at least one flight control parameter to be changed, and wherein the at least one flight control parameter comprises at least one of air-speed, an altitude, a cost index, an angle of attack, a heading, a flight path, a flight profile, a surface configuration of the aircraft, engine bleed, power extraction, or air supply.

7. The system of claim 1, wherein the one or more first sensors comprise at least one of a pitot sensor, a static pressure sensor, an accelerometer, or an air temperature sensor, wherein the in-flight performance parameters comprise at least one of nautical air miles, fuel flow, drag, weight, center of gravity, air speed, cost index, flight time, air frame, or engine status.

8. The system of claim 2, wherein the one or more second sensors comprise at least one of a spoiler position sensor, a flap position sensor, a gear position sensor, a flaperon position sensor, a rudder position sensor, an aileron position sensor, or an engine sensor.

9. A system for the real-time optimization of aircraft fuel economy, comprising:
   one or more first sensors configured to generate first sensor data indicative of flight control parameters; and
   a processor configured to receive the first sensor data from the one or more first sensors, the processor configured to:
      determine a current level of fuel efficiency for a flight segment of a flight path based on the first sensor data,
      determine a target level of fuel efficiency for the flight segment based on the first sensor data and an aircraft performance flight model, wherein the aircraft performance flight model is representative of fuel efficiency of the aircraft based on flight parameters of at least one prior flight,
      in response to determining that a difference between the current level of fuel efficiency and the target level of fuel efficiency satisfies a threshold, identifying at least one flight control parameter to change to increase fuel efficiency, and
      send a signal indicative of the at least one flight control parameter.

10. The system of claim 9, further comprising one or more second sensors configured to generate second sensor data indicative of in-flight performance parameters, wherein the processor is configured to receive the second sensor data from the one or more second sensors, wherein the in-flight performance parameters comprise at least one of nautical air miles, fuel flow, drag, weight, center of gravity, air speed, cost index, flight time, air frame, or engine status, and wherein the target level of fuel efficiency is further determined based on the second sensor data from the one or more second sensors.

11. The system of claim 9, further comprising a third sensor configured to generate third sensor data indicative of fuel consumption, wherein the processor is coupled to receive the third sensor data information from the third sensor, and wherein the current level or the target level of fuel efficiency, or both, is further determined based on the third sensor data from the third sensor.

12. The system of claim 9, further comprising a fourth sensor configured to generate fourth sensor data indicative of aircraft position information during flight, wherein the processor is coupled to receive the fourth sensor data from the fourth sensor, and wherein the current level or target level of fuel efficiency, or both, is further determined based on the fourth sensor data from the fourth sensor.

13. The system of claim 9, further comprising one or more flight deck displays, wherein the one or more flight deck displays are configured to receive the signal from the processor and to display a notification indicating the at least one flight control parameter to be changed.

14. The system of claim 9, wherein the signal is configured to cause the at least one flight control parameter to be changed, and wherein the at least one flight control parameter comprises at least one of air-speed, an altitude, a cost index, an angle of attack, a heading, a flight path, a flight profile, a surface configuration of the aircraft, engine bleed, power extraction, or air supply.

15. The system of claim 9, wherein the one or more first sensors comprise at least one of a spoiler position sensor, a flap position sensor, a gear position sensor, a flaperon position sensor, a rudder position sensor, an aileron position sensor, or an engine sensor.

16. The system of claim 10, wherein the one or more second sensors comprise at least one of a pitot sensor, a static pressure sensor, an accelerometer, or an air temperature sensor.

17. A method for real-time optimization of aircraft fuel economy, comprising:
  receiving first sensor data indicating in-flight performance parameter from one or more first sensors;
  determining a current level of fuel efficiency for a flight segment of a flight path based on the first sensor data;
  determining a target level of fuel efficiency for the flight segment based on the first sensor data and an aircraft performance flight model, wherein the aircraft performance flight model is representative of fuel efficiency of the aircraft based on flight parameters of at least one prior flight;
  identifying at least one flight control parameter to be changed based on a comparison of the a current level of fuel efficiency and the target level of fuel efficiency; and
  sending a signal indicative of the at least one flight control parameter.

18. The method of claim 17, further comprising receiving second sensor data indicative of flight control parameters from one or more second sensors, and wherein current level of fuel efficient is further determined based on the second sensor data.

19. The method of claim 17, further comprising receiving third sensor data indicating fuel consumption from a third sensor, and wherein the current level or target level of fuel consumption, or both, is further determined based on the third sensor data.

20. The method of claim 17, wherein the signal is configured to cause the at least one flight control parameter to be changed, and wherein the at least one flight control parameter comprises at least one of air-speed, an altitude, a cost index, an angle of attack, a heading, a flight path, a flight profile, a surface configuration of the aircraft, engine bleed, power extraction, or air supply.

* * * * *